United States Patent [19]

Häusler et al.

[11] 4,429,992

[45] Feb. 7, 1984

[54] METHOD AND DEVICE FOR TESTING OPTICAL IMAGING SYSTEMS

[75] Inventors: Gerd Häusler, Erlangen; Walter Järisch, Boeblingen; Günter Makosch, Sindelfingen, all of Fed. Rep. of Germany

[73] Assignee: International Business Machines Corporation, Armonk, N.Y.

[21] Appl. No.: 266,243

[22] Filed: May 22, 1981

[30] Foreign Application Priority Data

May 24, 1980 [DE] Fed. Rep. of Germany ....... 3020022

[51] Int. Cl.$^3$ .................... G01M 11/00; G01B 9/02; G01B 11/14; H01L 21/66
[52] U.S. Cl. .................... 356/124; 356/345
[58] Field of Search ............... 356/345, 347, 354, 355, 356/356, 392, 393, 394, 389, 237, 124, 124.5; 350/320, 162.17, 162.2, 162.23

[56] References Cited

U.S. PATENT DOCUMENTS

| | | | |
|---|---|---|---|
| 3,726,595 | 10/1973 | Matsumoto | 356/356 |
| 3,891,321 | 6/1975 | Hock | 356/356 |
| 3,967,903 | 7/1976 | Enami et al. | 356/394 |
| 4,159,522 | 6/1979 | Zanoni | 356/345 |
| 4,218,142 | 8/1980 | Kryger et al. | 356/394 |
| 4,221,487 | 9/1980 | Lacombat et al. | 356/394 |
| 4,299,482 | 11/1981 | Task | 356/124 |

OTHER PUBLICATIONS

Jarrell et al. "Some New Advances in Grating Ruling, Replication and Testing", *Applied Optics*, vol. 3, No. 11 (Nov. 1964) pp. 1251-1262.

*Primary Examiner*—R. A. Rosenberger
*Attorney, Agent, or Firm*—Jackson E. Stanland

[57] ABSTRACT

Optical imaging systems are used for making microstructures, and have to be very precise. In order to test these imaging systems, a new method, and a device for carrying out this method, are described in which two interferograms are made and compared. In a first step, an interferogram of an original pattern is made, followed by a second step in which an interferogram of a copy of the original pattern is produced using the identical conditions used to form the first interferogram. The pattern copy is made in the imaging system to be tested. In a third step, the two interferograms are compared with one another to provide a measure of the accuracy of the imaging system. This technique can be used for testing imaging systems which produce only a mirror image.

18 Claims, 6 Drawing Figures

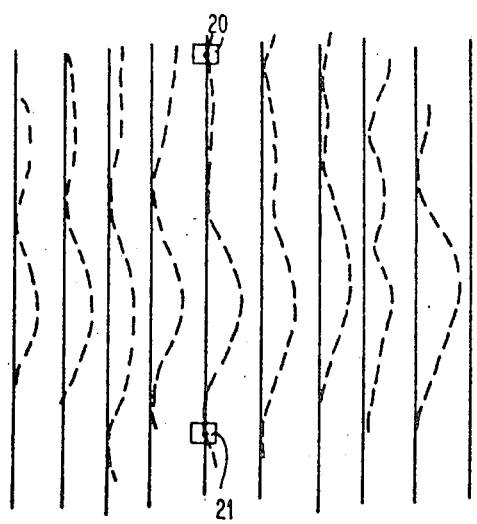
FIG. 2A
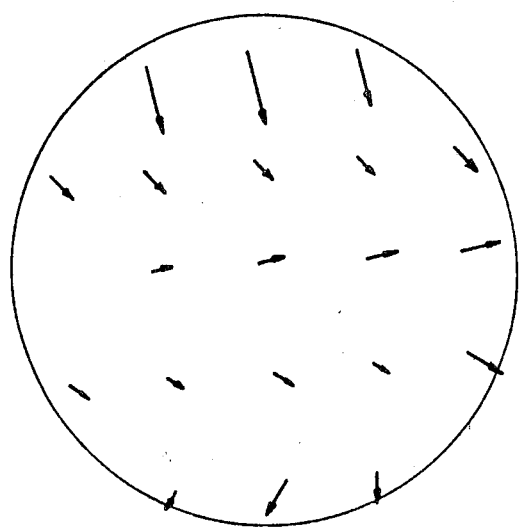
FIG. 2B
FIG. 4
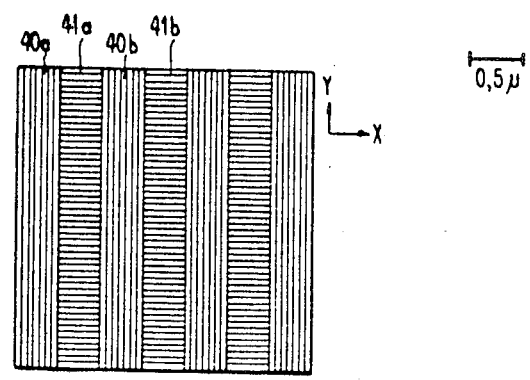

METHOD AND DEVICE FOR TESTING OPTICAL IMAGING SYSTEMS

DESCRIPTION

1. Technical Field

The invention relates to a method for testing optical imaging systems where an original pattern is compared with a pattern copy made by the imaging system to be tested, and a device for carrying out this method.

2. Background Art

In many fields of research and technology, optical imaging systems are used on which increasing demands for precision are made. The photolithograhic methods used in the production of integrated semiconductor circuits are particularly important examples. The efforts to reduce the manufacturing costs of such circuits and to increase the switching speed lead on the one hand to a minimization of the circuits and consequently to their increased density on the semiconductor chip, and on the other to continuously increasing dimensions of the semiconductor wafers on which a plurality of such semiconductor chips (chips) can be processed in one process step. At present, the smallest circuit structures that can be made by means of photolithographic methods in the visible range of the spectrum are approximately 2 $\mu$m; the semiconductor wafers and consequently the field of view of the optical imaging systems used have reached a diameter of 10 to 15 cm. The high demands on the precision of the optical imaging systems involve even stricter demands on the precision of the methods applied for testing such imaging systems. If circuit structures with a minimum size of 1 $\mu$m are to be made it is necessary to define the imaging characteristics of the photolithographic systems down to a precision of 0.1 $\mu$m. These tests refer to the following parameters:

1. The local distortion of the imaging system at each point of the field of view. If the individual local distortion of each imaging system is known, systems with the same or similar local distortion characteristics can be selected and used together in one production line where several exposure steps with different systems are to be carried out. In this manner the overall yield, referring to the entire semiconductor wafer, can be increased considerably.
2. Scale errors, i.e. deviations from the theoretical imaging scale of the imaging system (in photolithographic processes frequently 1:1).
3. Further errors, as follows:
   rotation, i.e. global rotations
   translation, i.e. global shifts
   orthogonality, i.e. angular distortions.

All these errors, which together represent the distortion, should be known individually for each point of the entire field of view. In the prior art, however, no methods are known by which such measurements can be executed with acceptable efforts and the necessary precision.

The testing process which is used most frequently today consists in imaging a specific test pattern, e.g. a vernier raster made by the system to be tested, and measuring the image point by point, e.g. microscopically, in order to locate distortion errors. This method is, however, very time-consuming so that only a few points (e.g. 9) of the field of view can be measured. Furthermore, the precision that can be reached very much depends on the operator's practice and care (the respective points measured are individual points, and there is no automatic averaging over large local areas).

Apart from the measurement of individual points it is also possible to apply methods according to which large areas of the fields of view are tested in parallel for distortion errors. For that purpose, test patterns can be used which are imaged by the system to be tested, and subsequently tested for deviations. With test patterns having a periodic structure, the copy can be tested interferometrically; Moiré methods are also possible as shown in copending German patent application No. P 30 19 930.5, filed May 24, 1980 (U.S. counterpart application Ser. No. 266,242 filed May 22, 1981. However, these parallel tests supply only resolutions $\geq 0.5$ $\mu$m in practical use. This limitation is a consequence of the unavoidable tolerances in the production of the original grating, and of the optical components used for building the testing system.

These error sources, unavoidable in practical use, are to be discussed with reference to the example of the interferometric measuring of periodic patterns which as a rule is very precise, as described e.g. in German Offenlegungsschrift No. 21 50 110. For the precise measurement of a pattern, it is illuminated with two laser beams showing symmetrical angles of incidence. From the interference pattern obtained the form of the pattern can be precisely determined, and thus in principle also the deviation from the original pattern.

However, the absolute measurement of the distortions of the grating copy permits only a limited precision ($\geq 0.5$ $\mu$m), for the following reasons:

1. Technically producible original gratings have defects which are repeated in the grating copy; the absolute measurement of the grating copy thus simulates defects not existing in the imaging system.
2. The optical elements required for interferometerically measuring the grating copy, e.g. beam expansion (collimator) systems, are not without defects and cause distortions of the wave fronts in the interferometer. These distortions increase with the size of the optical components. In fields of view of 10 cm and more as required for the semiconductor wafers used today, these wavefront distortions cause considerable errors in the interferometric measurements.

In order to be able to also measure errors of the imaging scale apart from local distortion, the absolute value of the angle of incidence of both symmetrically impinging laser beams has to be set very precisely. For semiconductor wafers with a diameter of 10 cm, and with a measuring precision of 0.1 $\mu$m, the angle should be settable to a precision of 0.1 second of arc. The reason for this is that the number of interference stripes in the field of view of an observer is considered when determining imaging scale errors. This number depends very much on the angle between the two light beams illuminating the grating, and also depends on the grating constant of the illuminated grating. Such a precisely reproducible setting of absolute angles is not possible in practical use.

It is therefore an object of the present invention to provide a method and a device for measuring the local distortion and the imaging scale of optical imaging systems with a large field of view, whose precision is at least 0.1 micrometers, and which permits the simultaneous measurement of the entire field of view.

DISCLOSURE OF THE INVENTION

The novel measuring process consists of recording in a first step the interferogram of an original grating, of recording in a second step with identical conditions the interferogram of a grating copy made in the imaging system to be tested, and comparing in a third step the two interferograms made, by preference electronically.

In this reference process executed in two successive steps, all optical and mechanical component defects unavoidable in practical use are compensated, extremely precise and absolute adjustment settings are also avoided, and environmental influences are largely excluded. The device required for carrying out the method has an uncomplicated structure since only the relative positions of the original grating and the grating copy are to be maintained with regard to the interferometric structure. In contrast with this, a simultaneous comparison of the original and copy gratings would involve great optical efforts which in turn would lead to uncontrollable defects.

The possible sensitivity of this method is higher than 0.1 μm (up to 0.05 μm) and the scale error of an imaging system can be determined with a precision of more than 0.1 μm. This method can also be applied for testing imaging systems producing a mirror image only.

These and other objects will be apparent from the following more detailed description of the preferred embodiments.

BRIEF DESCRIPTION OF THE DRAWINGS

FIG. 2A shows the superposition of the interferograms of the original grating and grating copy (in one coordinate direction).

FIG. 2B shows the detected distortion field of an optical system, with the local distortion being given (in both coordinate directions).

FIG. 4 shows a grating structure with orthogonal partial gratings.

BEST MODE FOR CARRYING OUT THE INVENTION

Figure 1A:
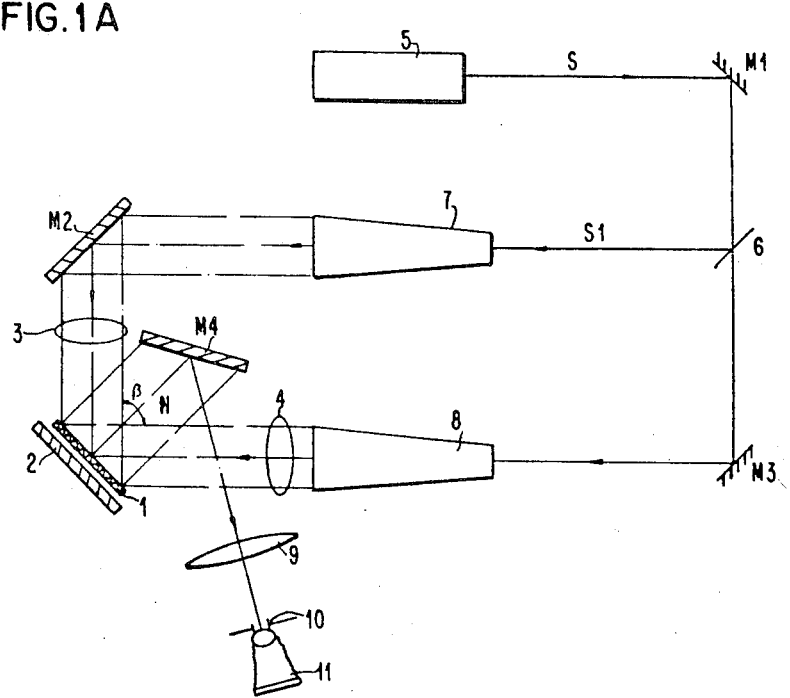
FIG. 1A shows the basic structure of an interferometric measuring arrangement for examining the original grating, or grating copy, respectively.

FIG. 1A shows the basic structure of an interferometric measuring arrangement permitting the comparison of two grating structures. Grating 1 to be tested is arranged on an adjustable fixture 2 (shown in detail in FIG. 3) and is subjected to two light beams 3, 4 impinging symmetrically to the normal of the grating surface at an angle $\beta$. Parallel beams 3 and 4 are produced out of light beam S of a laser 5 by means of a beam splitter 6, two beam expansion optics 7, 8, and deflection mirrors M1, M2, M3. The light of a specific diffraction order diffracted at grating 1 is directed via a deflecting mirror M4 and a lens 9 to an observation aperture 10 where the forming interference pattern can be stored photographically or with an electronic recording unit 11. All components used for building this optical system, e.g. beam expansion optics 7 and 8 and mirror M2, are preferably of maximum precision; i.e., the distortion of the wave fronts by beam expansion optics 7 or 8 and mirror M2 should e.g. not be higher than $\lambda/20$, where $\lambda$ is the wavelength of the light.

For carrying out the above described method, the original grating is first placed in fixture 2, and its interferogram is stored with optical registration device 11. In the second step of the method, the grating copy (which has been made in the imaging system to be tested) is placed in fixture 2. Normal N of the grating copy is to subtend the same angle relative to the symmetrical axis of the illuminating waves, as did the normal of the original grating, with a precision of up to 1 minute of arc. This demand can be easily met by mechanical means (see discussion in connection with FIG. 3).

In order to be able to bring the original grating and the grating copy into the same spatial position, measuring marks are provided on both gratings; the gratings are both placed into fixture 2 in such a manner that a selected interference stripe passes through both measuring marks. After this orientation of the grating copy the corresponding interferogram is registered in recording unit 11.

Figure 1B:
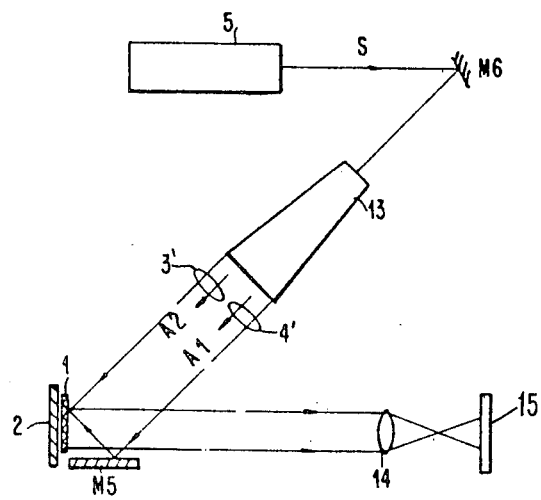
FIG. 1B shows a simplified interferometric measuring arrangement for examining the original grating or grating copy.

The structure shown in FIG. 1B is a simplified arrangement for interferometrically measuring the original grating and the grating copy, and will be described in more detail later.

FIG. 2A shows an example of two superimposed interferograms of the original grating and the grating copy. The solid lines correspond to the interference lines of the original grating, and the dashed lines correspond to the interference lines of the grating copy. The two above-mentioned measuring marks through which pass the interference lines are given reference numbers 20 and 21.

From the mutual spacing of two associated interference lines for the original and the copy, the respective local distortion and the imaging scale error can be determined. If a grating with a grating constant of 4 μm is used, and if observation takes place in the fourth diffraction order it will be sufficient to determine the position of the interference stripes to a stripe width of 1/5 to achieve the necessary precision of 0.1 μm. In an observation in the fourth diffraction order, angle $\beta$ approximate satisfies the condition $$\sin \beta \approx (4 \cdot \lambda)/g_o,$$

where $\lambda$ is the wavelength of the illuminating waves and $g_o$ is the grating constant.

The local distribution and the size of the distortions over the entire field of view can be represented after the evaluation of the interferograms as a vector field in accordance with FIG. 2B; this process can be done fully automatically when the interferograms are entered into the storage of a computer as digital values, and if the vector field is to appear on a screen.

For permitting a precise localization on the grating copy a clearly visible pattern of reference lines can be additionally applied thereon by exposure.

By turning the original grating by 90° in the production of the grating copy in the imaging system, distortion and scale defects can successively be determined in X- and Y-directions.

However, orthogonality can be measured with a modification of the above-described process: For that purpose, instead of a one-dimensional grating a grating field is used which consists of different orthogonal partial gratings. FIG. 4 shows a possible example with stripe gratings, where partial gratings 40a, 40b, . . . are of vertical orientation, while partial gratings 41a, 41b, . . . are of horizontal orientation. For the simultaneous production of interferograms of both directions X, Y (FIG. 4) the grating or its copy is to be illuminated with two pairs of symmetrically impinging waves. The planes of incidence are to be oriented perpendicularly to each other in X- and Y-directions.

Translation and rotation of the gratings do not have any influence on this measuring technique. Thus, a small relative shifting of the original and copy between the two measurement steps does not affect this novel measuring method.

However, if apart from distortion, orthogonality, and scale errors, translations and rotations are to be measured, too, microscopically evaluatable measuring marks are provided on the original and the copy prior to exposure by the copier.

Figure 3:
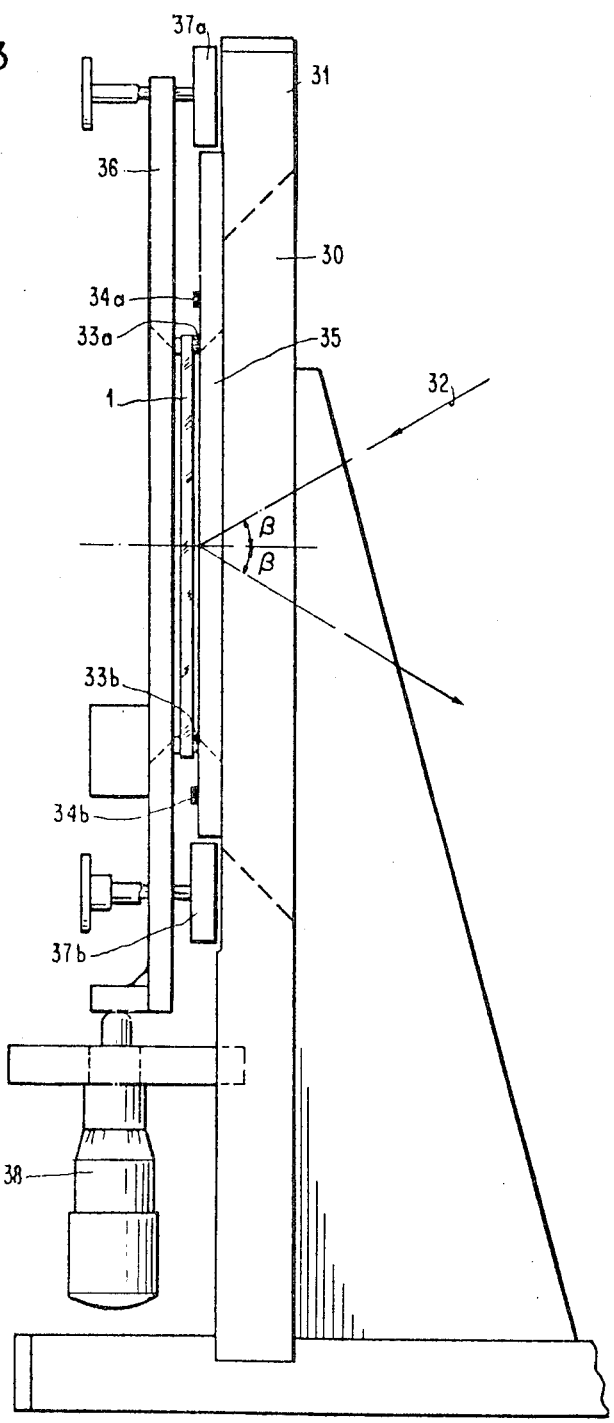
FIG. 3 shows a schematic representation of the fixture for holding the original grating or grating copy.

FIG. 3 shows the mechanical construction of a suitable holding fixture for the original grating and grating copy, which provides a reproducibility sufficient for the required adjustment. FIG. 3 is a lateral view of this rotation-symmetrical receiving fixture. Grating 1 is illuminated from the right with a light beam 32 through a circular opening 30 in a carrier plate 31. The exact position of the grating is determined by a three-point support 33a, 33b of a stop ring 35, the exact position of the slightly larger grating copy by a three-point support 34a, 34b. The latter three-point support 34 is higher by fractions of a millimeter than three-point support 33. Both three-point supports are ground with the same setting of stop ring 35, and thus define two planes parallel to each other so that original and copy can be adjusted with a parallelism of less than one minute of arc.

For fixing the original grating or the grating copy, respectively, a receiving element 36 is used, which is magnetically pulled toward the three-point support (magnets 37a, 37b). Consequently, small air gaps remain between magnets 37 and carrier plate 31. Owing to the movable suspension of receiving element 36 the gratings can be adjusted with respect to rotation and translation by means of differential micrometer screws 38. The fixture is of such a design that the original and copy can be exchanged within seconds so that the two interferometric measurings can be performed under identical conditions without any time stabilization problems.

In many conventional photolithographic imaging systems the copy corresponds to a mirror image of the original. Maintaining the geometric conditions, which are necessary for achieving a high precision, is possible through the following additional steps:

If the grating shows random defects, and if the defects of the wave fronts of illuminating beams 3, 4 are rotation-symmetrical, a reflection of the grating does not cause any additional defects in the measuring technique. For evaluation it is therefore possible to compare an interference pattern of the original grating with a reflected interference pattern of the copy to be tested (reflecting can e.g. be effected electronically).

If the grating and the wave fronts show random defects then the grating must be reflected for the measuring process. Gratings arranged on a transparent substrate are rotated for that purpose about an axis perpendicular to the optical axis, and illuminated from the back. The illuminating waves then pass through the substrate glass, and there will generally be defects through irregularities and in non-parallel glass planes. However, since the present measuring process uses a fully symmetrical structure, and since both interference illumination wave parts pass approximately through the same parts of the substrates, these defects are largely compensated.

The original gratings required for carrying out the testing process are advisably produced as chromium patterns on a glass substrate. The known tools of photolithography (automatic exposure machines, art work generator) can be used for making an individual grating which subsequently in a step and repeat camera is multiplied onto a substrate whose size corresponds to the respective field of view. The precision achieved here is 0.15 micrometer or better.

The grating copy is also advisably made as a chromium pattern on a glass or silicon substrate. The method usually applied in semiconductor technology to define patterns in $SiO_2$ on Si is not applicable here because the thickness variations that would be produced in the oxide layer would cause phase distortions in interferometric measuring.

For thermal and mechanical reasons it can be advantageous to use quartz substrates for the original grating and/or the grating copy. In order to avoid interference on front and back exposures of these substrates they are made in a slightly wedge-like shape. If it is necessary to illuminate the original grating from the back, owing to reflection in the imaging system, the wedge shape does not cause any defects only in those cases where the grating lines extend perpendicularly to the edge of the wedge.

For a quick visual testing of the optical imaging properties of a system it is advisable to produce the interference lines of the original grating as straight lines so that the distortion defects of the system can be derived directly from the deviations of the interference lines of the copy from those of the original. Straight interference lines of the original, however, cannot be obtained owing to the unavoidable optical defects of the components in the interferometric testing system, even if the original grating were an ideal grating.

The imaging defects of the interferometric testing system can, however, be compensated when the original grating is made with the same wave fronts that are used later for interferometrically measuring the copy. This can be accomplished in an apparatus similar to that of FIG. 1A by using a substrate with a photosensitive layer thereon. Interfering light beams 3 and 4 then produce a periodic line pattern which, after corresponding photolithographic processing, is used as the original grating in the testing method described herein. This original grating then generates in registration device 11 interference lines representing straight lines.

A simplified arrangement for interferometrically measuring original gratings or grating copies of small dimensions is shown in FIG. 1B. The beam of laser 5 is directed to only one beam expansion optic unit 13, and one half 3' of the expanded parallel beam is applied directly to grating 1 in fixture 2, and the other half 4' is applied to grating 1 after reflection from a mirror M5, whose plane is perpendicular to the plane of grating 1. A lens 14 arranged in the direction of the surface normal of grating 1 then collects the positive and negative diffraction part of a high diffraction order to generate in a recording device 15 the interference images of the original grating or of the grating copy, respectively. The angle of incidence of partial beams 3' and 4' onto grating 1 is to be reproducible again to approximately 1 minute of arc.

Having thus described our invention, what we claim as new, and desire to secure by Letters Patent is:

1. A method for testing an optical imaging system where an original pattern is compared with a pattern copy made by the imaging system to be tested, including the steps of generating a first interferogram of said original pattern by two light beams symmetrically impinging and overlapping on said original pattern, making a pattern copy of said original pattern using said imaging system to be tested, generating a second interferogram of said pattern copy under conditions identical to those used to generate said first interferogram, and comparing said first and second interferogram to determine the relative deviations between said first and second interferograms said deviations being a measure of the quality of said optical imaging system.

2. The method of claim 1, wherein said original pattern is a linear optical grating.

3. The method of claim 1, wherein said original pattern is a grating field having partial gratings oriented perpendicularly to each other.

4. The method of claim 3, wherein said partial gratings are arranged in stripes.

5. The method of claim 1, wherein said original pattern is a grating produced as a metal structure on a transparent substrate, said grating having a grating constant in the order of micrometers.

6. The method of claim 5, wherein said substrate has a slightly wedge-like form, and wherein the grating lines of said grating extend perpendicularly to the edge of said wedge.

7. The method of claim 1, including the further steps of electronically storing said first and second interferograms and electronically comparing said first and second interferograms.

8. The method of claim 1, wherein said original pattern is a grating field having partial grating groups oriented perpendicularly to each other, and wherein each partial grating group is illuminated by two separate parallel light beams generated by splitting an incoming beam of light, said two beams impinging on said original pattern and on said pattern copy of said original pattern at the same angles of incidence.

9. The method of claim 8, wherein a predetermined selected diffraction order is observed after incidence of said light beams on said original pattern and copy.

10. The method of claim 1, wherein said original pattern and said pattern copy of the original pattern are comprised of grating fields having partial grating groups oriented perpendicularly to one another, wherein each partial grating group of said original pattern and pattern copy is illuminated by a portion of a single input light beam, a first portion of said input light beam impinging directly on either said original pattern or pattern copy and a second portion of said light beam impinging on said original pattern or pattern copy not struck by said first portion after reflection from a mirror, said first and second portions being incident onto said original pattern and pattern copy with the same angle of incidence.

11. The method of claim 10, wherein a predetermined selected diffraction order is observed after incidence of said first and second portions of said input light beam onto said original and copy patterns.

12. The method of claim 1, wherein said pattern copy is a mirror-image copy of said original pattern, made by rotating said original pattern about an axis perpendicular to the optical axis when the original pattern and the wavefronts of said light beams show random defects.

13. A device for testing an optical imaging system wherein an original pattern is compared with a pattern copy made by the imaging system to be tested, said device including in combination:

means for producing two light beams which are incident upon said original pattern and said pattern copy when said original pattern and said pattern copy are respectively placed in said device, to produce a first interferogram of said original pattern and a second interferogram of said pattern copy, said first and second interferograms being produced under identical conditions in said device, means for fixing said original pattern and said pattern copy, respectively, in said device, said means for fixing including three-point supports arranged on circles of different diameters, said circles defining two parallel planes separated by a small distance, a removable receiving element for fixing the original pattern or said pattern copy on said three-point supports, said removable receiving element being magnetically pushed against said three-point support.

14. The device of claim 13, wherein said means for producing said light beams includes means for producing an input light beam and means for sending a first portion of said input light beam directly to said original pattern or to said pattern copy, and means for sending a second portion of said input light beam to said original pattern or pattern copy not struck by said first portion of said light beam, after reflection from a mirror.

15. The device of claim 13, further including means for comparing said first and second interferograms with each other to determine the precision of said optical imaging system.

16. The device of claim 15, where said original pattern is a grating, and said pattern copy is a grating copy.

17. The device of claim 15, where said original pattern is a grating field having partial gratings oriented perpendicularly to each other.

18. The device of claim 15, wherein said original pattern is a grating produced on a transparent substrate having a wedge-like form, and wherein the grating lines of said grating extend perpendicularly to the edge of said wedge.

* * * * *